July 4, 1950  H. E. BARTSCH  2,513,275
BRAKE ADJUSTER
Filed Aug. 30, 1946  3 Sheets-Sheet 1
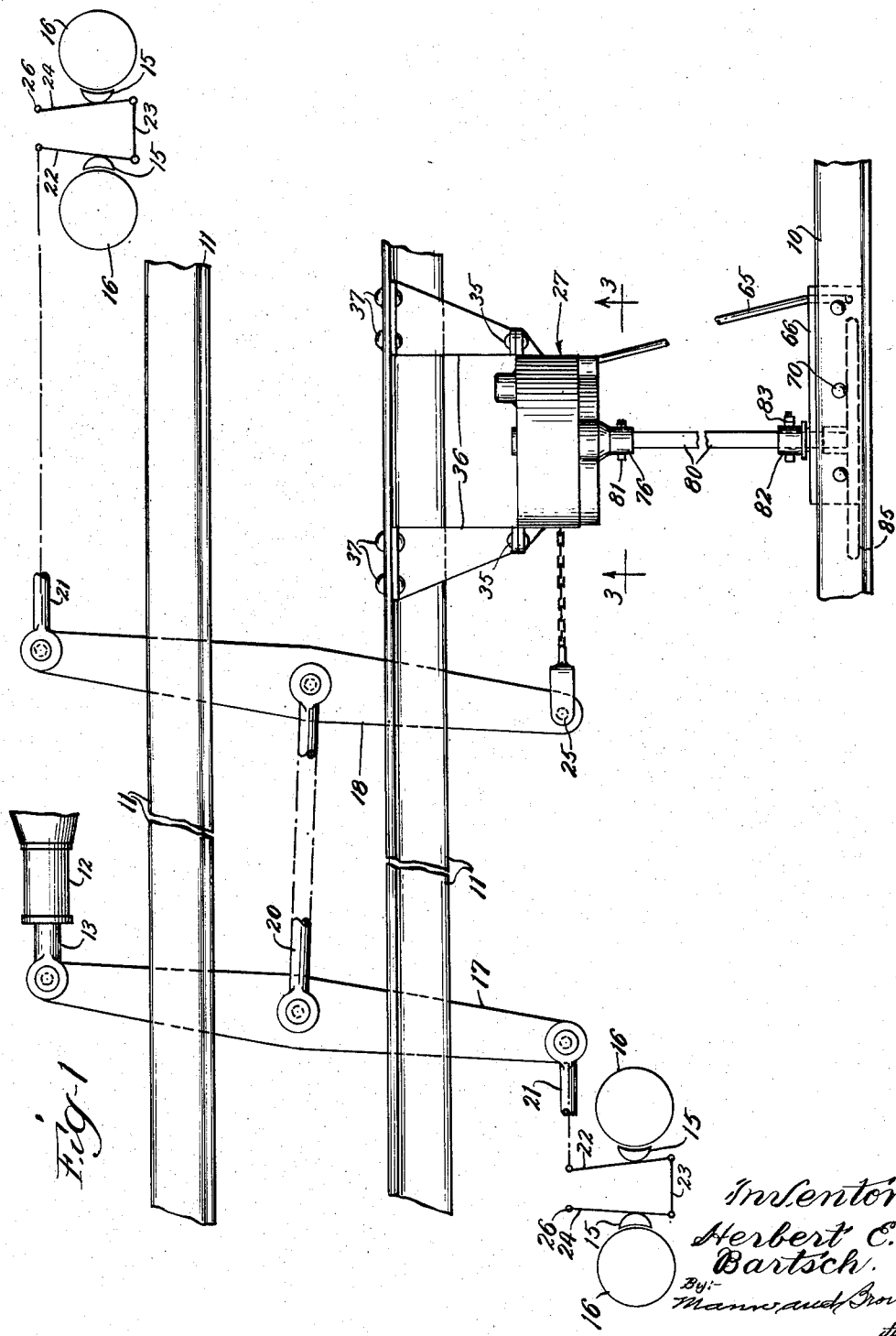
Inventor.
Herbert E.
Bartsch.

July 4, 1950 H. E. BARTSCH 2,513,275
BRAKE ADJUSTER
Filed Aug. 30, 1946 3 Sheets-Sheet 2
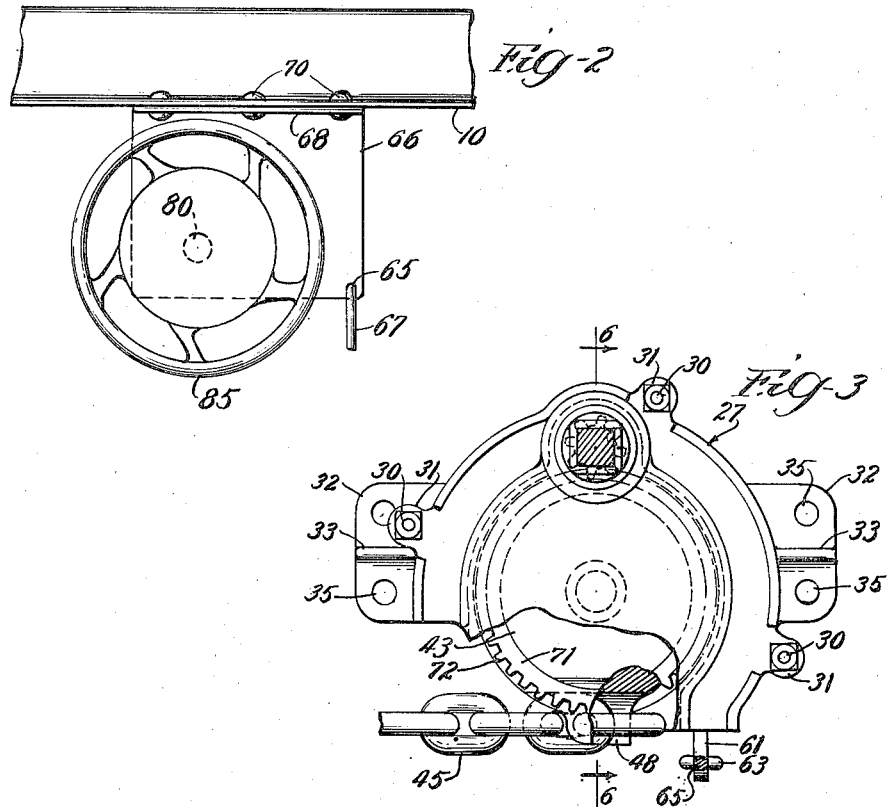
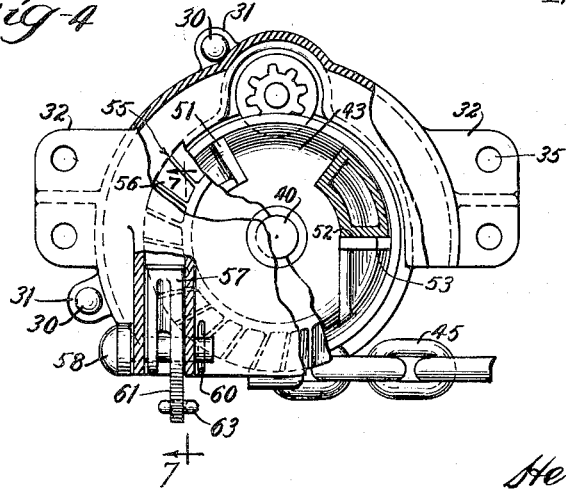
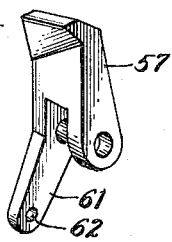
Inventor
Herbert E. Bartsch
By: Mann and Brown
Attys.

July 4, 1950 H. E. BARTSCH 2,513,275
BRAKE ADJUSTER
Filed Aug. 30, 1946 3 Sheets-Sheet 3

Inventor
Herbert E. Bartsch.
By Mann and Brown
Attys.

Patented July 4, 1950

2,513,275

UNITED STATES PATENT OFFICE 2,513,275

BRAKE ADJUSTER

Herbert E. Bartsch, Winnetka, Ill., assignor to Universal Railway Devices Co., a corporation of Delaware Application August 30, 1946, Serial No. 694,047

2 Claims. (Cl. 188—196)

My invention relates to adjustment devices for taking up the slack in the foundation brake gear of railway cars, and more particularly relates to a rotary slack adjuster adapted to be mounted under a car to take up excess slack in the brake gear.

In a brake adjuster of the present general type a flexible means, in the form of a chain, is connected at one end to the floating lever of the foundation brake gear, and is connected at its other end to a sheave to be taken up by the sheave whenever it is desirable to adjust the piston travel. Means is provided to actuate the sheave in a direction to take up the chain, along with releasable means to prevent, or at least to limit, reverse rotation of the sheave.

Since the application of brake-applying force to the foundation brake gear necessarily involves applying a reaction force to the chain, it is essential that the slack adjusting mechanism be structurally reliable with respect to withstanding such force. Any failure on the part of the slack adjuster that yields or releases the chain makes the whole brake system of the car inoperative.

An important object of my invention is to minimize the possibility of failure on the part of the pivot means or shaft that rotatably supports the slack adjusting sheave. This is accomplished largely by devising a mechanism in which the pivot means or shaft for the sheave serves solely as a fulcrum means in the transmission of forces. In other words, it is contemplated in the present invention that forces both for rotating the sheave and for resisting rotation of the sheave will be applied to the sheave itself directly and not through the pivot means or shaft on which the sheave is mounted. Such an arrangement is in contrast to the usual combination in which the force for rotating the sheave in a takeup direction and/or the force for resisting rotation in the opposite direction involve the placing of the sheave shaft under torque stress. There is much less likelihood of such a pivot means or shaft failing with serious results if it is required to serve solely as a simple fulcrum means and is never placed under appreciable torque.

A further purpose of my invention is to provide such a slack adjusting mechanism of relatively light aggregate weight. A specific object in this regard is to provide such a mechanism in which the weight of parts may be greatly reduced in the light of current practice without any risk whatsoever that failure of the lightened parts will jeopardize the functioning of the brake mechanism. With reference to lightness of weight this object is attained by incorporating reduction gearing in the slack adjusting mechanism whereby the mechanism may be actuated for slack takeup from a remote point with a relatively light actuating force. Thus the slack adjusting mechanism proper may be placed near the center sill of a railway car and operated remotely from the side of the car by means of a relatively light-weight shaft suitably adapted for manual rotation. As for the avoidance of risk in the use of such a light-weight shaft, by employing ratchet means directly cooperative with the sheave to prevent reverse rotation thereof I avoid involving the light actuating shaft in the application of brake-applying forces so that failure of the relatively light shaft cannot affect brake operation.

Other objects of the invention include the following: to provide a slack adjuster that may either be sold as a unit for installation on existing cars or may be incorporated in the construction of new cars; to provide a slack adjusting mechanism including a chain-winding sheave in which the forces for rotating the sheave in one direction, and for opposing rotation in the other direction, are applied directly to the sheave itself at a relatively great radial distance from the sheave axis; and to provide such a slack adjuster in which the principal working parts are arranged compactly in a housing adapted for mounting on or near the center sill of a railway car.

Other objects and advantages of my invention will be apparent from the following description taken with the accompanying drawings.

In the drawings, which are to be regarded as illustrative only:

Fig. 1 is a semi-diagrammatic view showing an application of the slack adjuster to the foundation brake gear of a standard freight car;

Fig. 2 is an end elevation of the slack adjusting mechanism as viewed from the side of the car;

Fig. 3 is a transverse section on a slightly enlarged scale, taken as indicated by the line 3—3 of Fig. 1, the view showing the slack adjuster housing with parts broken away;

Fig. 4 is a similar view from the opposite side of the housing, with parts of the housing broken away;

Fig. 5 is a perspective view, on an enlarged scale, of a pawl employed in the mechanism;

Figure 6:
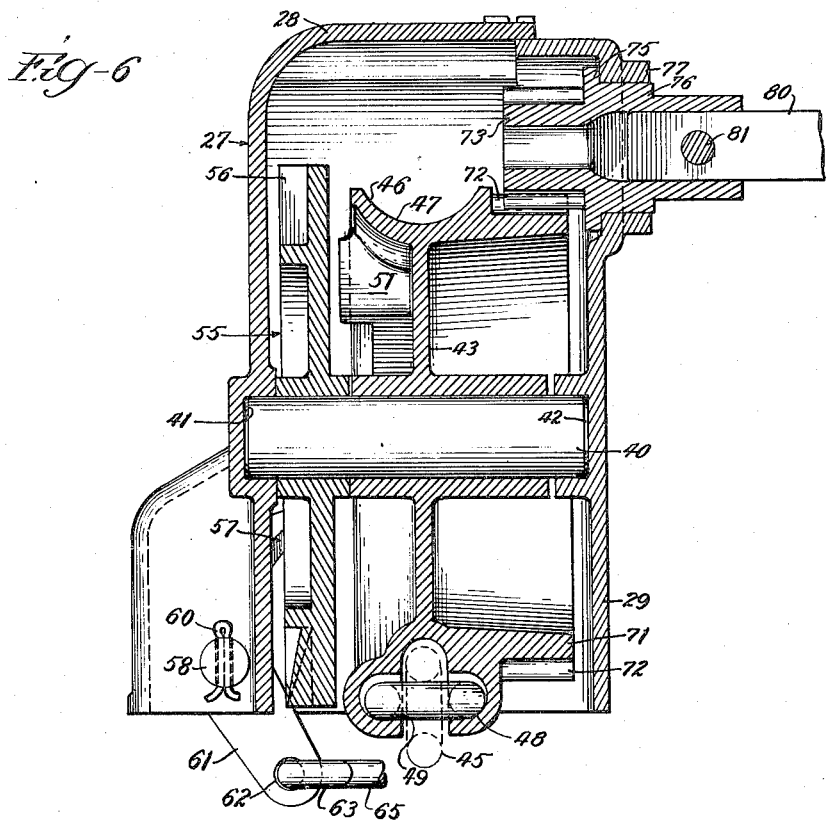
Fig. 6 is a section on a greatly enlarged scale, taken as indicated by the line 6—6 of Fig. 3.

In Fig. 1, numeral 10 designates the side sill or equivalent part of a railway car, and numeral 11 designates the center sill or equivalent central structural member. A brake cylinder 12, by means of a piston rod 13, actuates the foundation brake gear of the car to apply the brake shoes 15 to the car wheels 16. The brake gear includes the usual live cylinder lever 17, dead cylinder lever or floating lever 18, tie rod 20, top rods 21, live truck levers 22, intermediate rods 23, and dead truck levers 24.

In the particular embodiment of the invention chosen for this disclosure, adjustment of the foundation brake gear is accomplished by shifting the fulcrum 25 of the floating lever 18, but it will be understood that such adjustment may also be accomplished in other ways, for example, by shifting the fulcrums 26 of the dead truck levers 24.

The major parts of the brake adjusting mechanism are enclosed in a suitable support or housing, generally designated 27, mounted on the car at a substantial distance inward from the side of the car and relatively near the center sill 11. This housing 27 is preferably made in two sections 28 and 29, which are united by suitable bolt means 30 extending through ears 31. The housing may be mounted on the car in any suitable manner. In the construction shown in the drawings the housing section 28 is formed with wings 32, reinforced by webs 33, the wings being apertured at 35 to receive rivets. The housing is shown riveted to a pair of brackets 36, which brackets are in turn mounted on the web of the center sill 11 by means of rivets 37.

Inside the housing 27 a pivotal mounting means, in the form of a stub shaft 40, is seated at its opposite ends in sockets 41 and 42 formed in the housing sections 28 and 29, respectively. Rotatably mounted on the shaft 40 is a sheave 43 for reeling in or taking up one end of a flexible connecting means in the form of a chain 45 that is connected to the previously mentioned fulcrum 25 of the floating lever 18.

The sheave 43 has a concave felly 46, providing a circumferential working surface 47 to receive the chain 45. At one point in its circumference the sheave is formed with an anchoring pocket 48 whereby the chain 45 may be attached to the sheave. As indicated in Figs. 3 and 6, the walls of the pocket 48 form a radial slot through which one link of the chain may extend with the next adjacent link inside the pocket positioned transversely of the slot. The chain may be anchored against dislodgment from the pocket 48 by any suitable means, such as a pin or wire (not shown).

Any suitable means may be provided for preventing or limiting reverse rotation of the sheave 43 in reaction to brake-applying forces. In the present arrangement it is contemplated that such means for blocking reverse rotation of the sheave will engage the sheave at a relatively great distance from the sheave axis; in other words, relatively near the concave felly 46. In the construction shown, one face of the sheave 43 is provided with two circumferentially spaced lugs 51 and 52 (Fig. 4) for abutment alternately by a third lug 53 that is integral with a ratchet wheel 55.

Figure 7:
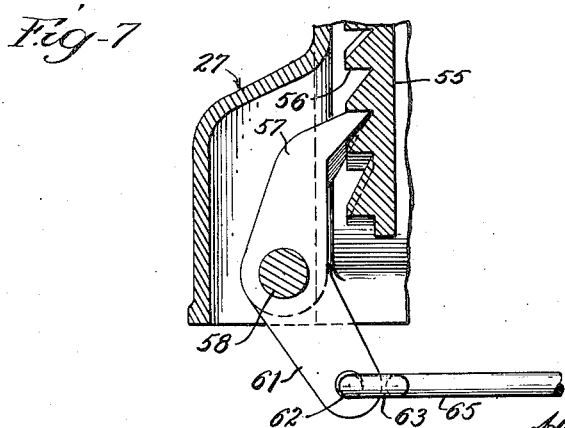
Fig. 7 is a fragmentary section taken on the line 7—7 of Fig. 4.

As best shown in Fig. 6, the ratchet wheel 55 is mounted on the stub shaft 40 adjacent the sheave, and is provided with suitable ratchet teeth 56 for engagement by a pawl 57. The pawl 57 is mounted on a pivot pin 58 that is secured by a cotter pin 60, and the pawl is suitably biased toward engagement with the ratchet wheel. As indicated in Fig. 7, gravitational bias of the pawl may be achieved by forming the pawl with an operating arm 61 at an appropriate angle, the operating arm having an eye 62 to receive the looped end 63 of an operating rod 65. The arm 61, by virtue of its angular position, tends by gravitation to throw the pawl 57 against the ratchet wheel 55, and such tendency is augmented by the weight of the operating rod 65.

The operating rod 65 extends to the side of the car through an aperture in a vertical support plate 66, and is turned downward at its outer end to form an operating handle 67. The vertical support plate 66 is bent to form a flange 68 at its upper edge, as best shown in Figs. 1 and 2, and is secured to the side sill 10 by suitable rivets 70 extending through the flange.

It is contemplated that force for rotating the sheave 43 in the direction to take up the chain 45 will be applied directly to the sheave at a substantial distance from the sheave axis. In my preferred construction I provide for this purpose a suitable gear 71 of approximately the diameter of the sheave, the gear being directly connected with the sheave for rotation therewith. In the present construction the gear is actually integral with the sheave, the two being a single casting. Thus Fig. 6 shows the gear 71 as an integral lateral extension of the sheave 43 coaxial therewith, the extension being formed with peripheral gear teeth 72 in mesh with a pinion 73 of relatively small diameter.

The pinion 73 is formed with a radial flange 75 inside the housing 27, and is formed with a hollow hub 76, which hub is journaled in a suitable bearing 77 formed by the wall of the housing.

Any suitable means may be provided for actuating the pinion 73 from a point at the side of the car remote from the housing 27. Since the described arrangement of a relatively large gear and a relatively small pinion provides a highly favorable gear ratio for actuation of the sheave 43, only relatively light operating force need be applied to the pinion 73 to take up the chain 45, and therefore relatively light weight means may be used to transmit actuating force over the distance that separates the housing 27 from the side of the car. In the present embodiment of the invention I employ a shaft 80, the shaft 80 being so much lighter than the usual actuating shaft that it may aptly be described as a light rod rather than a shaft. It is apparent that there is no serious risk of brake failure in making the shaft 80 light because failure of the shaft would not prevent the described ratchet and pawl mechanism from anchoring the chain 45 against brake actuating forces.

The light shaft 80 is seated at its inner end in the hollow hub 76 of the pinion 73, and is suitably secured therein by a pin 81. The outer end of the light shaft 80 extends through the previously mentioned vertical support plate 66, and preferably is journaled therein by an adapter sleeve 82, the adapter sleeve being anchored against axial movement along the shaft by a cotter pin 83.

The shaft 80 may be adapted at its outer end for manual operation in any suitable manner. In the present arrangement I mount a suitable hand wheel 85 on the shaft, the hand wheel being positioned on the outer side of the vertical support plate 66 and preferably directly below the side sill 10.

The manner in which the described mechanism operates will be readily understood from the foregoing description. Normally, by virtue of force transmitted by the chain 45, the sheave is stationary with the sheave lug 52 in abutment against the ratchet wheel lug 53, as indicated in Fig. 4. Whenever it is desired to take up slack in the foundation brake gear the car man will rotate the hand wheel 85 clockwise, as viewed in Fig. 2, whereupon the rotation of the pinion 73 in mesh with the gear teeth 72 will initially rotate the sheave 43 to carry the sheave lug 52 away from the ratchet wheel lug 53, the second sheave lug 51 moving into abutment with the ratchet wheel lug. Continued rotation of the sheave with the sheave lug 51 against the ratchet wheel lug 53 will cause the ratchet wheel to rotate with the pawl 57 riding over the ratchet teeth. When the tension of the chain 45 prevents further manual rotation the car man releases the wheel 85, whereupon the force transmitted by the chain causes reverse movement of the sheave until such reverse movement is stopped by abutment of the sheave lug 52 against the ratchet wheel lug 53. The spacing between the faces of the lugs 51 and 52 is such that the lost motion just described is sufficient to provide proper brake shoe clearance between the brake shoes 15 and the wheel 16 when the piston rod 13 is in inoperative or retracted position.

When worn brake shoes 15 are to be replaced by new brake shoes, the car man grasps the handle 67 of the operating rod 65 and pulls the operating rod outward to cause the pawl 57 to swing out of engagement with the ratchet wheel 55. The released ratchet wheel then is free to rotate in its reverse direction along with the sheave 43 in response to force transmitted by the chain 45, thereby to provide such slackness in the brake gear as will permit the installation of the new shoes. After the new shoes are installed the hand wheel 85 is rotated clockwise, as heretofore described, to take up the slack in the brake gear to the required extent for resuming operation of the brakes.

The preferred form of my invention described in specific detail herein will suggest to those skilled in the art various changes and substitutions within the scope of my appended claims.

I claim:

1. In combination with the foundation brake gear of a railway car including a dead brake lever, the fulcrum of which is adjustable longitudinally of the car to effect adjustment of said gear, an adjusting device mounted on the car underframe near the center line thereof, said device comprising a housing, a sheave in the housing, a relatively large driving gear for the sheave, a relatively small pinion gear in mesh with the driving gear, a ratchet wheel having a lost motion driving connection with the sheave corresponding to normal brake shoe clearance, a pawl mounted on the housing and cooperating with the ratchet wheel to hold the sheave in adjusted position, said sheave, driving and pinion gears and ratchet wheel all being journalled within said housing for rotation about an axis transverse to the longitudinal center line of the car, a pinion shaft extending to the side of the car and equipped with means for manual rotation, means for manually releasing the pawl from the ratchet wheel, including a member extending to a side portion of the car in proximity to said pinion shaft, and a flexible connector between the brake fulcrum and said sheave adapted to be wound upon the sheave as the latter is rotated by manipulation of said pinion shaft, said pawl transmitting braking forces through said housing directly to the central portion of the car underframe upon which the adjusting device is mounted.

2. In combination with the foundation brake gear of a railway car including a dead brake lever, the fulcrum of which is adjustable longitudinally of the car to effect adjustment of said gear, an adjusting device mounted on the car underframe near the center line thereof, said device comprising a housing, a sheave, a ratchet wheel having a lost motion driving connection with the sheave corresponding to normal brake shoe clearance, a pawl mounted on the housing and cooperating with the ratchet wheel to hold the sheave in adjusted position, said sheave and ratchet wheel being journalled within said housing for rotation about an axis transverse to the longitudinal center line of the car, a shaft for rotating the sheave extending to the side of the car and equipped with means for manual rotation, said pawl and ratchet wheel arrangement including ratchet teeth on a side face of said wheel with the pawl movable out of engagement with said teeth by a force exerted transverse to said center line, a pawl actuator operatively connected to the pawl and extending to a side portion of the car in proximity to said shaft, and a flexible connector between the brake fulcrum and said sheave adapted to be wound upon the sheave as the latter is rotated by manipulation of said shaft, said pawl transmitting braking forces through said housing directly to the central portion of the car underframe upon which the adjusting device is mounted.

HERBERT E. BARTSCH.

REFERENCES CITED

The following references are of record in the file of this patent:

UNITED STATES PATENTS

| Number | Name | Date |
|---|---|---|
| 1,753,133 | Sauvage | Apr. 1, 1930 |
| 1,971,368 | Camp | Aug. 28, 1934 |
| 2,336,691 | Kenney | Dec. 14, 1943 |